United States Patent [19]

Belcher

[11] Patent Number: 4,630,976

[45] Date of Patent: Dec. 23, 1986

[54] CUTTING TOOL

[76] Inventor: Henry Belcher, 61 Somers Dr., Fulton, N.Y. 13069

[21] Appl. No.: 735,596

[22] Filed: May 20, 1985

[51] Int. Cl.$^4$ .......................... B23P 15/28; B26D 3/16
[52] U.S. Cl. .......................................... 407/65; 51/204
[58] Field of Search ................. 30/347; 29/78, 76 R; 407/65, 34, 42, 12, 55; 51/71,204

[56] References Cited

U.S. PATENT DOCUMENTS

| | | | |
|---|---|---|---|
| 644,020 | 2/1900 | Ludwig | 29/78 X |
| 1,647,134 | 11/1927 | Jennings | 29/76 R X |
| 1,931,498 | 10/1933 | Kattrein | 29/76 R |

Primary Examiner—Douglas D. Watts
Attorney, Agent, or Firm—Bruns and Wall

[57] ABSTRACT

A tool for removing unwanted metal from the inside of a pipe weld joint that is being repaired between two pipe sections. The tool is designed to be passed into the joint region after the defective weld segment has been removed. The tool consists of an elongated shank integral with a circular cutting segment having teeth on the upper surface thereof for removing unwanted metal from the inside of the weld joint. The shank and the circular body section are both thin enough to permit the body section to be passed through the repair opening left behind by the removal of the defective weld section. The shank is adapted to be coupled to a power drive for rotating the cutting segment at a desired speed.

11 Claims, 4 Drawing Figures

CUTTING TOOL

BACKGROUND OF THE INVENTION

This invention relates to repairing a weld joint formed between two pipe sections and, in particular, to a tool for cleaning out the inside of the weld joint after a defective section of the joint has been removed.

In many pipe welding applications the integrity of pipe weld joint is inspected using a non-destructive inspection techniques, such as X-ray or the like, to determine if the weld is strong enough for its intended purpose. The inspection of pipe welds is vital in the construction of nuclear power plants and or high pressure vessels where a failure in the weld could lead to a serious and potentially dangerous equipment failure. Codes governing the fabrication of these units dictate that the welds be inspected after completion to determine if they are acceptable. In the event a crack or void is found in the joint, the defective area is usually removed and replaced with new weld material.

To repair an unacceptable weld, it is the common practice in the art to grind away the weld material in the defective segment of the weld joint while leaving the acceptable section of the weld in place. This creates a void in the joint in the form of a slotted opening that is later closed by adding new weld material. Prior to adding the new weld, the peripheral surfaces surrounding the void left by the removal of defective weld must be cleaned or prepared to accept the new weld. The base metal surrounding the void is typically hand filed to remove burrs and oxidized metal that can adversely affect the soundness of the new weld. Removal of unwanted materials from the exterior surfaces surrounding the repair opening can usually be accomplished without difficulty. Preparing the more difficult to reach interior surfaces, however, often times poses a greater problem. If these surfaces are not properly prepared there is a high probability that the repaired weld will again fail inspection, whereupon, the piece must be scrapped or further reworked. In any event, failure to properly repair the weld can be both costly and time consuming.

Heretofore, it has been the practice in the art to clean the inside of the repair joint area with a tool called a "hook file". As the name implies, the hook file typically is a circular file having a hook-like appendage at one end that can be passed through the repair opening into the interior of the pipe joint. The hook end of the file is brought under the lip of the repair opening and hand worked to abrade or scrap away unwanted material on the interior surface of the new weld joint. A hook file is usually made of high carbon steel which has been hardened and is therefore relatively expensive and the cost of repairing the weld becomes correspondingly high. Beyond this, the time to complete the hand filing operation on these difficult to reach surfaces is relatively long. Even after extensive working it is hard to judge if the operation has been successfully completed.

SUMMARY OF THE INVENTION

It is therefore an object of the present invention to improve repairs made to circular weld joints used to join pipe sections.

It is a further object of the present invention to reduce the cost of repairing circular weld joints of the type used to join pipe sections.

Yet another object of the present invention is to quickly and accurately remove unwanted material from the inside of a pipe weld that is undergoing repair.

Another object of the present invention is to provide a power operated tool for removing burrs and unwanted material from the inside of a weld joint that is being repaired prior to closing the repaired area with new weld.

These and other objects of the present invention are attained by means of a tool for preparing the surrounding interior surfaces of an opening formed in a pipe weld joint by the removal of defective weld material from an existing weld joint. The tool includes an elongated shank that is attached to a power drive and which can pass through the repair opening found in the existing weld. A circular cutting segment is secured to the distal end of the shank which has a radius of curvature less than the inside radius of the pipe sections making up the joint. The axis of the shank passes through the center of curvature of the circular cutting segment with the outer surface of the segment facing the shank. The outer surface of the circular cutting segment is further provided with cutting teeth adapted to remove unwanted material from the inside surfaces of the repair opening. The width of the cutting segment, like the width of the shank is thinner than the joint opening so that it can be passed into the pipe passage. In practice the cutting segment is carried by the shank into the interior of the pipe joint with the teeth facing the repair region. The power drive is then actuated to rotate the segment. The teeth are then brought into contact with the surfaces to be cleaned. Rocking the tool slightly while it is rotating insures that the entire interior area surrounding the repair opening is properly prepared to receive the new weld.

BRIEF DESCRIPTION OF THE DRAWINGS

For a better understanding of these and other objects of the present invention, reference is had to the following detailed description of the invention which is to be read in conjunction with the accompanying drawings, wherein.

DESCRIPTION OF THE INVENTION

Figure 1:
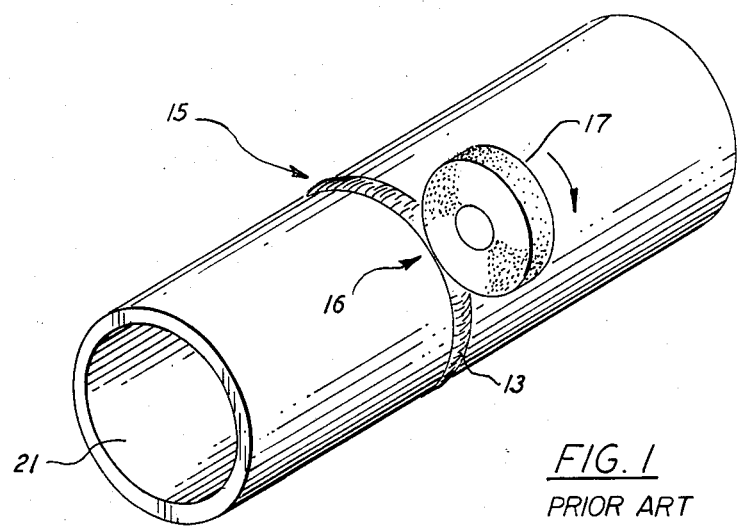
FIG. 1 is a perspective view showing a typical pipe weld undergoing repair.

Turning initially to FIG. 1, there are shown two similar pipe sections 10 and 11 that are joined in axial alignment by means of a weld joint 15 formed between the abutting end of the two pipe sections. For purposes of explanation, it will be assumed that the weld 13 has been inspected and a section of the weld at 16 found to be defective. Rather than scraping the welded part, the defective section of the weld is being removed by means of a grinding wheel 17. The width of the grinding wheel is about as wide as the weld joint and is able to pass through the weld in the defective region thus leaving a circumferentially disposed void or repair opening 20 (FIG. 2) along the line of the joint. New weld material shall be placed in the opening to repair the joint. However, before the repair weld can be started, the peripheral region about the repair opening must be properly prepared to receive the new weld. Burrs created by the grinding operation and unwanted residual materials left behind from the previous welding operation must be removed. The residual material may be in the form of unwanted metal oxides that are formed at the relatively high welding temperatures. After grinding, the exterior surfaces surrounding the repair opening, which are readily accessible, can be readily cleaned using well known hand filing techniques. The interior surfaces, which are less accessible, are however more difficult to clean.

Any appreciable amount of unwanted material left in this region that might protrude into the flow passage of the welded part will be noted during further inspection and the part again rejected for being defective.

Figure 2:
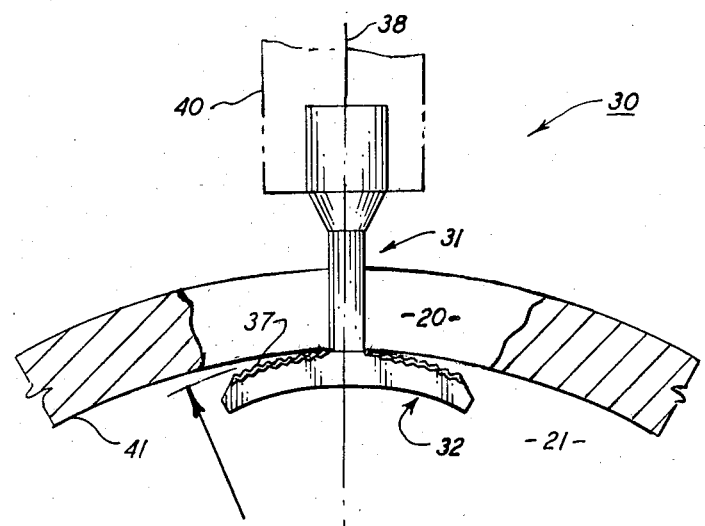
FIG. 2 is an enlarged partial end view in section showing a tool embodying the teachings of the present invention passed into a weld joint that is undergoing repair.
Figure 3:
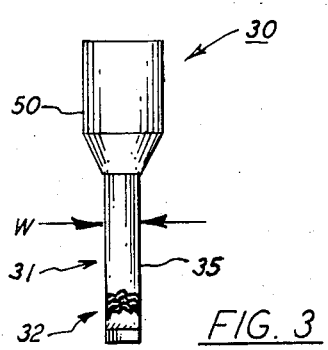
FIG. 3 is an end view of the tool shown in FIG. 2.
Figure 4:
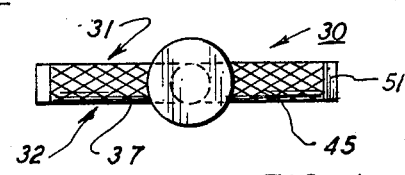
FIG. 4 is a top view of the tool shown in FIG. 2.

The present tool, generally referenced 30 in FIG. 2, is designed to be passed into the flow passage 21 of the pipe through the repair opening 20. As further illustrated in FIGS. 3 and 4, the tool includes a cylindrical shank 31 that is integral with a circular cutting segment 32. The one piece shank and cutting segment assembly is made of tool steel that has been tempered so that the tool will resist breakage and exhibit long life. Both the body 35 of the shank and the cutting segment are of the same width (W) which is slightly less than the width of the grinding wheel 17 used to create the repair opening. Accordingly, the cutting segment can be passed downwardly into the pipe passage through the repair opening as shown in FIG. 2.

The outside surface 37 of the circular segment has a radius of curvature (R) that is less than the inside radius of the pipe sections. The axis 38 of the shank bisects the segment and passes through the center 39 of circular segment. Accordingly, the tool can be rotated by a power drive, which is shown in phantom outline at 40 in FIG. 2, about its axis 38 while contained inside the pipe without the tool binding against the inside wall 41 of the passage. The outside surface 37 of the cutting segment 32 contains a series of cutting teeth 45 that are adapted to move in contact against the interior surfaces surrounding the repair opening. Although a double cut tooth profile is shown in the drawings, the profile of the teeth may vary depending upon the metal being worked without departing from the teachings of the present invention. The teeth on the cutting surface 37 may be flame or case hardened after the teeth have been generated to prevent the teeth from wearing excessively and thus extending the life of the tool. Alternatively, the teeth may be formed of carbide that is bonded to the top surface of the cutting segment by any one of many well known bonding techniques. In any event, the teeth are arranged to efficiently work the base metal surrounding the repair opening to remove all residual or unwanted material from this region.

The proximal end of the shank is provided with an expanded head 50 that is capable of being slidably received in a standard size chuck utilized by most power drives. In operation, the cutting segment of the tool is passed through the repair opening into the flow passage of the pipe as noted above and the drive at a desired cutting speed. The teeth formed on the top surface of the cutting segment are now brought upwardly into contact with the interior rim of the repair opening. Because the radius of curvature of the cutting surface is less than the inside radius of the pipe passage, the tool can be rocked slightly while in contact with the rim surfaces to insure that all surfaces are properly worked.

A chamfer 51 is provided at each end of the cutting surface 37 that allows the tool to be repositioned without binding upon the inside wall of the pipe sections. The user of the present tool soon develops a "feel" for the cutting operation that results in the interior surfaces of the repair opening to be efficiently machined to eliminate unwanted or residual material from this difficult to work region.

The top or cutting surface 37 of segment 32 may also be provided with a second radius of curvature extending across its width. The second radius of curvature is preferably equal to the first with its center lying upon the center 39.

Accordingly, the top cutting surface of the tool is generally circular in form whereby it can be rolled in reference to inside surfaces of the pipe sections. Although the shank and the cutting segment are shown fabricated from a single piece of material, the shank and the cutting elements can be, for ease of manufacturing, made from two separate parts. In assembly, the shank can be joined to the segment using such techniques as silver soldering or threaded couplings.

While this invention has been described with reference to the structure disclosed herein, it is not confined to the details set forth and this application is intended to cover any modifications or changes as may come within the scope of the following claims.

I claim:

1. A cutting tool for removing unwanted material from the interior of a welded pipe joint that is being repaired wherein a portion of the weld material has been removed from the joint to provide a repair opening into the pipe passage, said tool including
    a cutting segment having cutting teeth formed along a convexly curved top surface thereof, said segment being curved along its length with the radius of curvature of the top surface being less than that of a pipe section forming the weld joint, said segment having a width that is less than the width of the weld joint,
    an elongated shank having a width substantially equal to that of the cutting segment, said shank being connected at one end to the top surface of the segment and extending radially therefrom, the axis of said shank bisecting the segment and passing through its radius of curvature, whereby the segment can be passed through the repair opening into the pipe passage and rotated inside the passage by turning the shank.

2. The cutting tool of claim 1 wherein the other end of the shank includes further means for connecting the shank to a power drive for rotating the tool.

3. The cutting tool of claim 1 wherein the teeth are formed of carbide capable of removing unwanted material from the interior surfaces of the pipe joint.

4. The cutting tool of claim 1 wherein the cutting segment and the shank are unitarily formed of a single piece of tempered tool steel.

5. The cutting tool of claim 1 wherein the outside surface of the cutting segment is chamfered at each end.

6. The cutting tool of claim 1 wherein the opposite end of the shank contains an expanded head capable of being received in a chuck.

7. The cutting tool of claim 1 wherein the top surface of the cutting segment is further curved along its width.

8. The cutting tool of claim 7 wherein the radius of curvature along the width of the segment is centered at the radius of curvature along its length.

9. A cutting tool for removing unwanted material from the interior of a welded pipe joint that is being repaired wherein a portion of the weld material has been removed from the joint to define a repair opening into the pipe passage, said tool including
   a cutting segment having cutting teeth formed along its top surface, the segment being curved along its length with a radius of curvature of the top surface being less than that of a pipe section forming the weld joint and the segment having a width less than the width of the weld joint, and
   an elongated shank having a width substantially that of the cutting segment, said shank being connected at one end to the cutting segment at its center and extending radially therefrom, the axis of the shaft bisecting the segment and passing through its radius of curvature, whereby the segment can be passed through the repair opening into the pipe passage and rotated inside the passage by turning the shank, wherein the shank is silver soldered to the center of the cutting segment.

10. The cutting tool of claim 1 wherein the cutting segment and the shank are unitarily formed from a single piece of material.

11. The cutting tool of claim 1 wherein said shaft is rigidly connected to the top surface of said cutting segment.

* * * * *